Nov. 1, 1938.   H. ZIEBOLZ ET AL   2,134,745
METHOD OF AND APPARATUS FOR PROPORTIONING THE FLOW OF FLUIDS
Original Filed Oct. 7, 1936
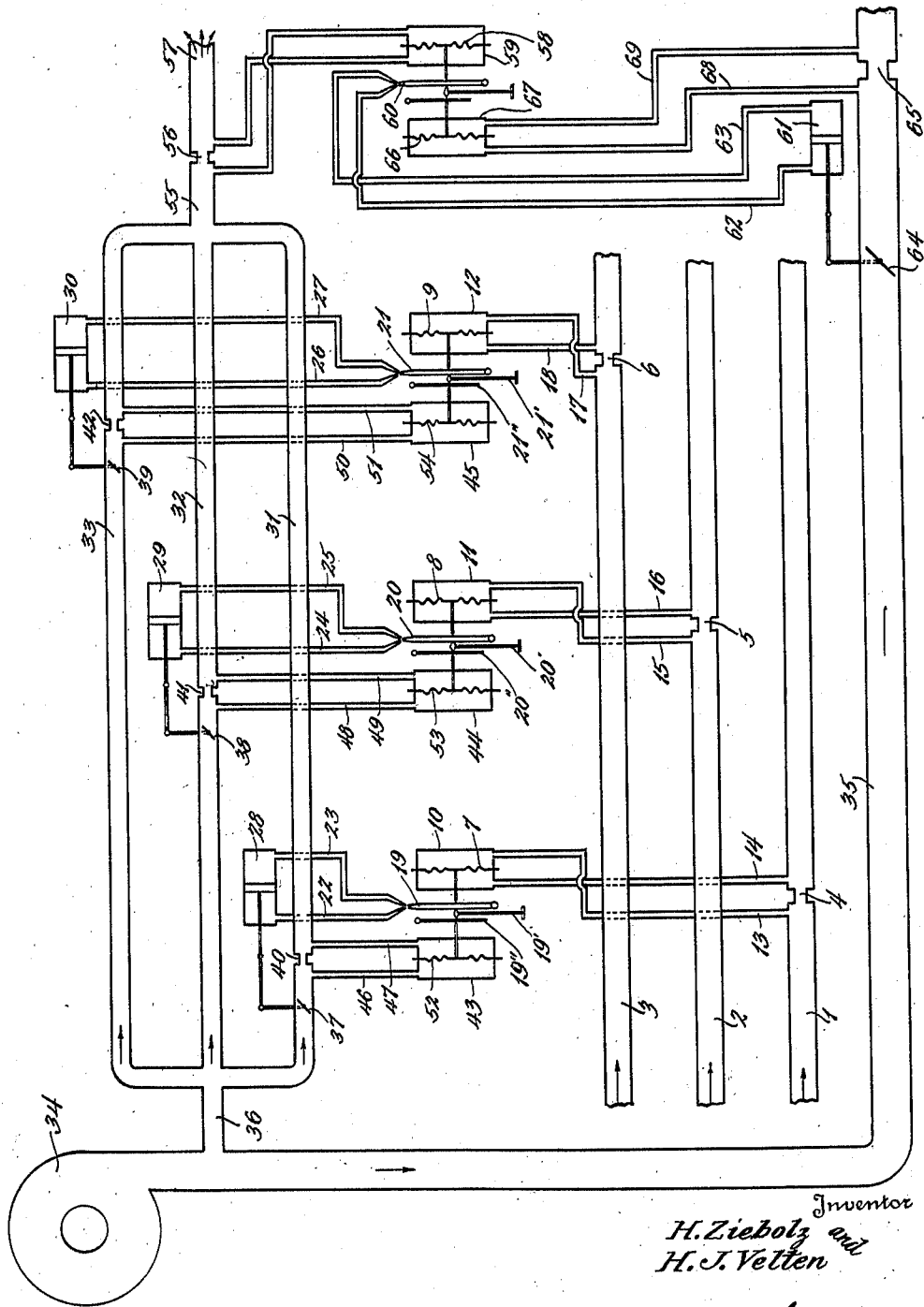
Inventor
H. Ziebolz and
H. J. Vetten
By A. D. Adams
Attorney Patented Nov. 1, 1938

2,134,745

UNITED STATES PATENT OFFICE 2,134,745

METHOD OF AND APPARATUS FOR PROPORTIONING THE FLOW OF FLUIDS

Herbert Ziebolz and Hubert J. Velten, Chicago, Ill., assignors to Askania-Werke A. G., a company of Germany Application October 7, 1936, Serial No. 104,526
Renewed December 4, 1937

9 Claims. (Cl. 137—164)

This invention relates to an improved method of and apparatus for the proportioning of the flow of a first pressure fluid to the flows of a plurality of second pressure fluids which are of a different character from each other and all subject to flow variations. More particularly the invention relates to a method of and apparatus for the control of combustion of a plurality of combustible pressure fluids, such as gases and/or oils which are subject to variations in flow by proportioning air required for supporting the combustion to the combustible pressure fluids.

The invention aims to provide an improved, simple, reliable and accurate method and apparatus, more particularly for use in gas plants, steel mills and other industrial plants operating under difficult working conditions especially at places where the atmospheric air contains dust and soot.

The aims and objects of this invention will appear more fully from a consideration of the description which follows, together with the accompanying drawing wherein the figure shows diagrammatically, by way of example, one form of apparatus for practicing the invention.

The drawing is to be considered in all respects as illustrative and not restrictive, reference being had to the accompanying claims to indicate the scope of the invention.

In accordance with the novel method for proportioning a first pressure fluid to several second pressure fluids, it is proposed to create an auxiliary or pilot flow of a third pressure fluid, to divide said pilot flow into branch flows, to proportion each branch flow to the flow of one of the second fluids respectively, and to proportion the flow of said first fluid to the sum of the combined pilot flows.

The method may be practised in various ways. The pilot flow through the several branches may be derived from a common source and the pilot pressure fluid may be the same as one of the pressure fluids to be proportioned, such as the air for supporting combustion. The flow of the pilot fluids through the separate branches is controlled in response to variations in the flow of the respective second pressure fluids. This may be conveniently accomplished, by means of any suitable flow responsive devices connected to the conduits carrying the second fluids and arranged to operate valves in the pilot branches by means of regulators, preferably of the well known "Askania" jet-pipe type. The summation of the pilot flows is used to control the flow of the first fluid by means of a similar flow responsive device, regulator and valve.

In the illustrated example of apparatus for practicing the method, gases or other combustible pressure fluids of different character are delivered to a mixing or combustion chamber (not shown) through a series of conduits 1, 2 and 3. The arrows indicate the direction of flow through the conduits. The amount of flow through the conduits is determined by flow responsive devices 4, 5 and 6 shown as being of the well-known constriction type. The differential pressure set up by the flow at the constrictions acts on diaphragms 7, 8 and 9 in casings 10, 11 and 12, respectively. The diaphragm casings are connected to the conduits 1, 2 and 3 at points near the constrictions through pipes 13 and 14; 15 and 16; 17 and 18, respectively. The diaphragms act on relays, 19, 20 and 21, shown as being of the well known "Askania" jet-pipe type such as that shown and described in the patent to Wunsch: 1,558,529, dated October 27, 1925. The jet pipes emit jets of pressure fluid acting on receiving orifices of the pipes 22 and 23; 24 and 25; and 26 and 27, respectively, connecting and leading to servo motors 28, 29 and 30, each shown as having a cylinder and a piston movable therein.

Three pilot conduits 31, 32 and 33, one for each of the pressure fluid conduits 1, 2 and 3, are supplied with pilot pressure fluid from a suitable source. In this example, the pilot conduits are shown as supplied with air delivered by a fan or blower 34 supplying an air conduit 35, through a pipe 36. However, the pilot fluid may be any gas or liquid supplied from a common source or from separate sources at approximately the same pressure.

The air flowing through the pilot conduits 31, 32 and 33 is controlled by suitable flow controlling devices, such as butterfly valves 37, 38 and 39, operated by the servo motors 28, 29 and 30, respectively. The pressure fluid passing through the pilot conduits sets up differential pressures at constrictions 40, 41 and 42, connected to diaphragm casings 43, 44 and 45, through pipes 46, 47; 48 and 49; 50 and 51, respectively. The diaphragms 52, 53 and 54 inclosed in said casings are connected to act in opposition to the respective diaphragms 7, 8 and 9 tending, after displacement of the jet pipes 19, 20 and 21 to restore the same to their neutral positions. By adjusting the ratio in which the diaphragms act on each jet pipe, by means of the usual ratio sliders 19', 20' and 21', varying the leverage on the jet pipes of the cooperating ratio levers 19'', 20'' and 21'', the proportion of the pilot flows to the main flows may be varied and thereby the quantity of air for each gas according to its B. t. u. content.

The flow of air through the pilot conduits, after it passes the constrictions, is combined in a conduit 55 having a constriction 56 and is later discharged into the atmosphere at 57. The combined flow sets up a pressure differential across the constriction 56 acting on a diaphragm 58 in a casing 59. The diaphragm, in turn, acts on a jet pipe 60 controlling the position of a servo motor 61 by delivering operating pressure fluid through one or the other of a pair of pipes 62 and 63. The servo motor 61 operates a flow controlling device shown as being a butterfly valve 64, thereby varying the flow in the conduit 35. A differential pressure set up at a constriction 65 in the conduit acts on a restoring diaphragm 66 in a casing 67 connected by pipes 68 and 69 to the conduit near the constriction.

The cross section of each of the pilot branches and of the constrictions therein is large enough to prevent dust, soot or other impurities, contained in the operating air or pilot fluid, from clogging the same and thereby impairing the operation of the device.

The operation of the apparatus is as follows: If the flow of pressure fluid in one or several of the conduits varies, the differential pressure across the constrictions in that conduit will vary. Assuming the flow through conduit 2 increases, the differential pressure across the constriction 5 will increase and the diaphragm 8 will displace the jet pipe 20 counter-clockwise, resulting in a discharge of the jet pipe into pipe 24. The piston of the servo motor 29 will move to the right and thereby open the valve 38. The increased flow in pilot conduit 32 will set up a higher pressure differential across the constriction 41 and tend to restore the jet pipe by a force exerted by the diaphragm 53.

The increased flow through pilot conduit 32 results in an increase of the total pilot flow measured at the constriction 56. The rise in differential pressure will move the jet pipe 60 clockwise by a movement of the diaphragm 58. The jet pipe, discharging into pipe 62, will move the piston of the servo motor 61 to the right, thereby opening the valve 64 and increasing the flow through the conduit 35. Thus, it is easily seen that a change of flow in any one or all of the conduits, 1, 2 and 3 results in a corresponding change of flow through the conduit 35.

If the supply of pressure fluid to one of the conduits 1, 2 and 3 should cease, the common pilot fluid is prevented from flowing through it in the opposite direction, since the differential pressure, set up at the constriction, will cause the associated valve to close and hold it closed.

It is easily understood that instead of measuring the total pilot flow in the discharge pipe 56, it may be measured when entering the pipe by providing a constriction therein and connecting the jet pipe and control mechanism 58 through 69 to the same.

Many different commercial applications of the method and apparatus will be apparent to those skilled in the art. For example the invention may be applied to the air conditioning, to proportioning and mixing liquids, to the production of chemical compounds and the like.

Therefore, the present invention is not restricted to the particular apparatus shown and described for practicing the method. Moreover, it is not indispensable that all the features of the apparatus be used conjointly, since they may be employed advantageously in various combinations and subcombinations. Furthermore, the method is capable of many variations without departing from the spirit of the invention as set forth in the appended claims.

What is claimed is:

1. That method of proportioning the flow of a first pressure fluid to the flows of a plurality of second pressure fluids of a different character from each other and all subject to flow variations, which is characterized by supplying pilot fluid under substantially the same pressure to separate pilot conduits, one for each of said second pressure fluids; proportioning the flow of pilot fluid through said pilot conduits to the flows of the respective second fluids; and proportioning the flow of said first fluid to the total flow of pilot fluid.

2. That method of proportioning the flow of combustion air to the flows of a plurality of combustible pressure fluids of a different character from each other and all subject to flow variations, which is characterized by supplying pilot fluid under substantially the same pressure to separate pilot conduits, one for each of said combustible pressure fluids; proportioning the flow of pilot fluid through said pilot conduits to the flows of the respective combustible pressure fluids; and proportioning the flow of the combustion air to the total flow of pilot fluid.

3. That method of proportioning the flow of combustion air to the flows of a plurality of combustible pressure fluids of a different character from each other and all subject to flow variations, which is characterized by providing a pilot air flow, dividing said pilot air flows into branch flows, one for each of said combustible pressure fluids; proportioning said branch flows to the flows of the respective combustible pressure fluids; and proportioning the flow of the combustion air to the sum of the branch flows.

4. Apparatus for proportioning the flow of a first pressure fluid to the flows of a plurality of second pressure fluids of a different character from each other and all subject to flow variations comprising, in combination, a conduit for each of said second pressure fluids; means responsive to the flow through each of said conduits; a pilot conduit for each of said second pressure fluids; a source for supplying said pilot conduits with pilot fluid; means for varying the flow through said pilot conduits, including control means connected to be operated by the respective flow-responsive means; means responsive to the sum of the pilot flows; a conduit for said first pressure fluid; and means for varying the flow through said last-named conduit including control means connected to be operated by the means responsive to the sum of the pilot flows.

5. Apparatus for proportioning the flow of a first pressure fluid to the flows of a plurality of second pressure fluids of a different character from each other and all subject to flow variations comprising, in combination, a conduit for each of said second pressure fluids; means responsive to the flow through each of said conduits; jet pipe regulators connected to be controlled by said flow responsive means; a pilot conduit for each of said second pressure fluids; a source for supplying said pilot conduits with pilot fluid; means connected to be controlled by said jet pipe regulators for varying the flow through each of said pilot conduits; means responsive to the sum of the pilot flows; a jet pipe regulator connected to be controlled by said sum-of-the-flows-responsive means; a conduit for said first pressure fluid; and means connected to be operated by said last-named jet pipe regulator for varying the flow through said conduit carrying said first pressure fluid.

6. Apparatus for proportioning the flow of combustion air to the flows of a plurality of combustible pressure fluids of a different character from each other and all subject to flow variations, comprising, in combination, a conduit for each combustible pressure fluid; means responsive to the flow through each of said conduits; jet pipe regulators connected to be controlled by said flow responsive means; a pilot conduit for each of said combustible pressure fluids; a source for supplying said pilot conduits with pressure air; means connected to be controlled by said jet pipe regulators for varying the flow through each of said pilot conduits; means responsive to the sum of the pilot flows; a jet pipe regulator connected to be controlled by said sum-of-the-flows-responsive means; a conduit for combustion air; and means connected to be operated by said last-named jet pipe regulator for varying the flow of combustion air through said combustion air conduit.

7. Apparatus for proportioning the flow of combustion air to the flows of a plurality of combustible pressure fluids of a different character from each other and all subject to flow variations, comprising, in combination, a conduit for each combustible pressure fluid; a constriction in each of said conduits; differential pressure responsive means connected across said constrictions; jet pipe regulators connected to be operated by said different-pressure-responsive means; a pilot conduit for each of said combustible pressure fluids; a source of air for supplying all of said pilot conduits with pressure air; a valve means in each of said pilot conduits connected to be controlled by said jet pipe regulators for varying the flow of air through said pilot conduits; a constriction in each of said pilot conduits; differential pressure responsive means connected across said pilot conduit constrictions and connected to restore said jet pipe regulators to a neutral position; a common conduit communicating with said pilot conduits and combining the flow of air through all of the pilot conduits; a constriction in said common conduit; differential pressure responsive means connected across said last named constriction; a jet pipe regulator connected to be operated by said last named pressure responsive means; a conduit for combustion air; valve means in said combustion air conduit connected to be controlled by said last named jet pipe regulator; a constriction in said combustion air conduit; differential pressure responsive means connected across said last named constriction and connected to restore said last named jet pipe regulator to its neutral position.

8. Apparatus as claimed in claim 7 wherein the air for the pilot conduits is supplied by the same source which supplies the combustion air.

9. Apparatus for proportioning the flow of a first pressure fluid to the flows of a plurality of second pressure fluids of a different character from each other and all subject to flow variations comprising, in combination, a conduit for said first pressure fluid; a conduit for each of said second pressure fluids; means responsive to the flow through each of said second pressure fluid conduits; a pilot conduit for each of said second pressure fluids; means for varying the flow through said pilot conduits, including control means connected to be operated by the respective flow-responsive means; means responsive to the sum of the pilot flows; common means to supply said first fluid to said pilot fluid conduits and said first fluid conduit; and means for varying the flow through said first fluid conduit including control means connected to be operated by the means responsive to the sum of the pilot flows.

HERBERT ZIEBOLZ.
HUBERT J. VELTEN.